July 22, 1958

M. A. MÜLLER ET AL 2,844,427

TORSION COMPRESSION AND OIL RING

Filed Jan. 19, 1956

INVENTORS
Max A. Muller and
Wolfgang Glaser

BY Thomas, Weisman & Russell

ATTORNEYS

July 22, 1958  M. A. MÜLLER ET AL  2,844,427
TORSION COMPRESSION AND OIL RING
Filed Jan. 19, 1956  2 Sheets-Sheet 2
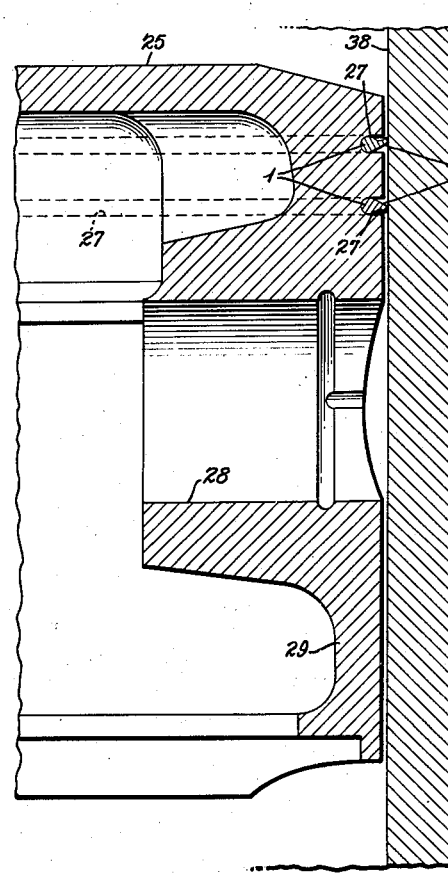
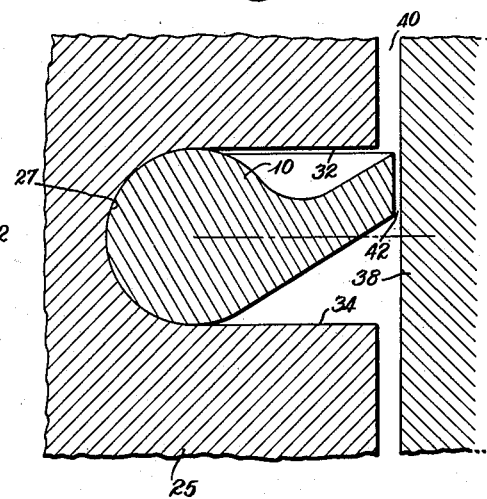
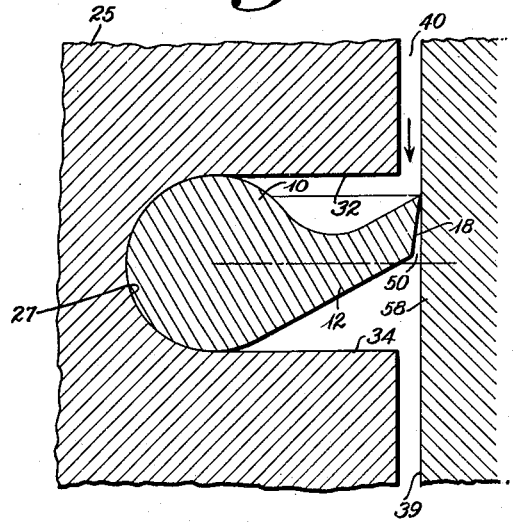
INVENTORS
Max A. Muller and
Wolfgang Glaser
BY Thomas, Weisman & Russell
ATTORNEYS

2,844,427

TORSION COMPRESSION AND OIL RING

Max Adolf Müller, Koln (Rhine), and Wolfgang Glaser, Burscheid, near Koln, Germany, assignors, by mesne assignments, to Rand Goetze Corporation, Cleveland, Ohio, a corporation of Ohio Application January 19, 1956, Serial No. 560,262

16 Claims. (Cl. 309—45)

This invention relates to a sealing ring of general utility for providing a seal between a stationary part and a part movable with respect thereto. This application is a continuation-in-part of application S. N. 492,932, filed March 8, 1955. More specifically, this invention relates to piston rings for use in internal combustion engines, and more particularly to a type of ring we prefer to describe as a "torsion" ring, in contrast to known rings of the prior art which are generally referred to as tension or expansion rings. The torsion rings of this invention are adaptable for use in both four-cycle and two-cycle engines, having a particularly high degree of utility when employed as a compression ring in both engine types. It is to be understood, however, that the present ring is not limited to use on pistons, and that its principles of operation and design are applicable to rings for various other uses, such as piston rod packing, pump plunger packing, etc.

In the past, it has been common practice to use rings, in engines of the type here under consideration, which, in general, are of square, rectangular, trapezoidal or similar radial cross section and adapted to be fitted into ring grooves in the piston which conform to such shapes. Rings of this type are so fabricated as to have an inherent property to expand radially and thus, as is well known, they are generally made of a resilient material that tends to retain a shape somewhat larger than the internal diameter of the given cylinder to which they are adapted to be fitted. Hence, such rings are in most cases fabricated of cast iron and heat treated, or of heat resistant steel or other alloys, basically ferrous in nature, that are extremely hard and adapted to retain this necessary resiliency or ring tension over long periods of extended use. In many instances, such rings are backed by resilient expanders to increase the pressure with which they engage the cylinder wall.

Efforts have been made to devise various alternates to this basic type of piston ring, such efforts often being directed to solving the problem known in the art as "fluttering," a fundamental cause of the further problems of so-called "blow-by" and ring breakage. But, in known types of tension rings, both problems are present, particularly at high speeds.

In the use of the tension ring, it is, of course, necessary to provide ring grooves which, relatively speaking, are considerably wider than the width of the ring to be fitted therein. Stated in another way, such rings are bounded on each side by a relatively substantial space or clearance between the rings and the adjacent sides of the ring grooves. A back clearance or space between the inner periphery of the rings and the bottom of the ring grooves is also to be understood as a requisite. These side clearances average generally between one and one-half to three thousandths of an inch with the back clearance being much greater, particularly when an expander is to be used behind the ring.

In the operation of such rings and, for example, during the compression, work and exhaust strokes of a four cycle engine, it is to be appreciated that the ring is forced downwardly to the lower side of the groove; whereas, on the suction stroke, the ring will shift and be caused to strike against the opposite side wall of the ring groove. In an engine suitable for use in modern automobiles, speeds from 5000 R. P. M. to 8500 R. P. M. are not infrequent. At even substantially lower speeds, however, tension rings, having in mind the back and side clearances referred to, will thus be caused to chatter or flutter with resultant considerable decrease in engine efficiency. Such decrease in efficiency occurs as a result of ignited gases under high pressure being blown by the sides of the ring and around the back thereof, particularly after some wear has occurred. Although at low speeds, horsepower and fuel losses may not be significant, appropriate tests will demonstrate that at moderate and relatively high speeds a severe problem of decreased efficiency is presented.

In summary, then, it is known that with the common form of rings of the shapes referred to, the gas cushion present at the back of the ring influences the contact of the ring against the cylinder wall, thereby causing excessive ring pressures. However, this objectionable contact is an inherent consequence of the customary construction of the ring and ring groove. The magnitude of these forces is dependent, from a construction viewpoint, on the play which is necessarily present. And as the piston, in running over dead center, necessarily changes the ring bearing from one side to the other of the ring groove, gaps occur temporarily on both sides, through which gaps the combustion gases and lubricating oil can pass freely with the result that efficiency is considerably reduced.

There are other disadvantages of the various types of tension rings of the prior art. For example, since the ordinary ring is, relatively speaking, loosely held within its groove, there is considerable difficulty in the transmission of piston heat through the ring to the relatively cool cylinder and consequently the temperature of the piston tends to be maintained at a value higher than if there were a close contact with the piston, whereby such heat, by conduction, could pass through the ring to the cylinder. In some engines, where the piston is cooled by oil, the tight fit of the torsion ring in its groove has the further advantage of transferring heat not only to the cylinder wall but also to the piston itself.

Also, being of the type of metal that is extremely hard and consequently rather brittle in nature, care must be used in positioning rings of the expansion type upon pistons. Breakage is not infrequent in the installation of the ordinary type of piston rings, which must be opened up sufficiently to ride over the head and lands of the piston before insertion in the several ring grooves.

Another factor to be considered with respect to tension rings is that of necessity they are constantly forced against the cylinder walls of the engine, irrespective of the various steps of the cycle thereof. In other words, ring and cylinder wear is thus a constant factor whether or not pressure is exerted against the sides or back of the ring due to successive phases of engine operation. According to the instant invention, a ring is provided that does not bear against the cylinder wall with any appreciable pressure during non-working phases thereof, or reciprocations of the piston that do not require a high pressure sealing contact between the cylinder wall and ring, i. e., during intake and exhaust. Hence, substantially less friction is involved in our structure—another factor contributing to less wear.

As is well known to those skilled in the art, piston rings are generally made with ring joints or gaps of either the scarf or step-cut type. In the case of tension rings, the gap clearance when the ring is compressed to cylinder size may be of the order of four to six thousandths per inch of ring diameter. With wear of the ring and/or cylinder wall, consequent further expansion of the ring will occur, it then being obvious that such gap will increase in amount and result in a reduction in ring tension. The direct effect of this is an increase of blow-by. In the structure of our invention, the ring is not under inherent expansion and, therefore, does not change in internal diameter. Hence, no amount of wear thereof will have any effect in producing blow-by. An additional economy in operation is thus obtained.

Finally, in known types of piston rings for internal combustion engines, the existing pressure against which the seal is to be used must be used with care to improve the sealing effect because of the unavoidable excessive ring pressure that might be developed. In the instant invention, such pressures are advantageously utilized in a novel manner and do materially contribute to the sealing effect without causing any excessive ring pressure against the cylinder wall.

The basic faults of prior art constructions as set forth in the foregoing are avoided by the piston ring herein described and claimed.

Briefly, our invention is directed to a sealing ring particularly adapted for use in internal combustion engines of either the two-cycle or four-cycle type which comprises an annular main body portion, approximately circular in radial cross section, that merges upon the cylinder wall contacting side thereof into an extended flange, the latter having a flattened end face which is adapted to engage the cylinder wall, in tight, sealing contact during the required periods of engine operation. It is contemplated that such ring be made of steel, cast iron, bronze and other metallic as well as suitable synthetic materials. The referred to annular main body portion has a generally semi-circular inner periphery that seats against a groove bottom of substantially the same shape and the flange extends outwardly in the plane of the body and is inclined towards the space to be sealed off, or, as here, towards the cylinder wall. The flange, in a position of rest, projects slightly from the groove and the front face of the flange represents the sealing surface.

The ring is herein described as a torsion ring since the portion which is of circular formation in cross section is adapted to torsionally rotate about its center axis in response to gas pressure acting upon the flange, particularly during the periods of the compression and explosion strokes of the piston. This effect is obtained by an internal twisting of the metal forming the round, annular portion of the ring due to the natural elastic properties of the material employed.

The inner or annular main body portion which, as stated, has a circular or substantially semi-circular formation in cross section, is adapted to fit into the ring groove within limits of comparatively slight tolerance—in other words, without any appreciable side clearance, since the ring does not move radially in the groove. Such a fit is thus a rather exacting one, the stated tolerance being only such as to permit torsional rotation in the sense described but to substantially prohibit chattering or fluttering. Hence, blow-by of gases between the ring and the piston is substantially, if not completely, prevented.

It is thus a primary objective of the instant invention to provide a piston ring utilizing the torsion principle as its basic concept, and taking the formation of an annular piston contacting body portion which is adapted to rotate about its center cross section axis to alternately tightly and lighly contact its flanged, contacting surface with the interior of the cylinder wall.

Another objective of the invention is to provide a piston ring construction which, in operation, takes advantage of the pressures against which a seal is to be maintained, to improve the seal. Thus, the pressures exerted during the compression and ignition strokes of the piston materially increase the force with which the contact flange of the ring bears against the cylinder wall. Such forces produce a tighter and more effective seal. As further explanatory of this objective of the invention, it is to be understood that particularly during the power stroke, and with respect to internal combustion engines of either the two-cycle or four-cycle type, the sealing effect of the torsion ring is far greater than that of known types of expansion rings; it follows that the piston ring of this invention is resultantly far more efficient in performance than such expansion rings of the prior art.

It is a further object of the invention to provide a piston ring which may be made of almost any torsionally resilient metallic or even synthetic material. This is because the ring need have no inherent expansive force but can be fabricated with only the durability of the material used as the foremost consideration. This being the case, manufacture of the ring is simplified to the extreme, even wire rolling methods being capable of producing the desired preformed annular and cross-sectional shape of the ring.

A further object of the invention is to provide a piston ring which, being in relatively tight contact with the ring groove of the piston during all periods of operation, obviates any possibility of fluttering and consequent blow-by, with a resultant increase in efficiency both with respect to fuel consumption and horsepower.

Another objective of the invention is the provision of a torsion ring which, by reason of its inherent flexibility and elasticity during operation, readily adapts itself to the non-concentricity and conicity of the cylinder.

An additional object of the invention is to provide a ring which, by reason of its torsional rotative function in operation, is far more effective in providing a seal against the side wall of the cylinder. This is because on the compression and work strokes of the piston, the pressures of the compressed or ignited gases tend to pivot the extended flange to a more lateral position, thus forcing it into tight and sealing contact with the wall; however, on the return or exhaust stroke and on the intake stroke, the ring rotates in the opposite direction to a position wherein the flange is not in tight sealing contact with the side wall of the cylinder. Actually, then, the ring is in tight pressure contact, and hence in potential wearing contact, with the cylinder wall only 50% of the time. The result is naturally to reduce the wear of the ring and cylinder wall in contrast to known types which, during all stages of operation, being expansible as tension rings, are in tight and wearing contact with the cylinder wall.

Another object of the invention is the provision of a piston ring suitable for use not only as a compression ring but readily adaptable for use as an oil ring.

Hence, the invention accomplishes a dual purpose, and torsion rings of this type can be employed as both compression and oil rings.

Other objects and advantages of this invention will be apparent from the detailed explanation which follows. A preferred embodiment of our piston ring is illustrated in the accompanying drawings, in which:

Figure 3 is a sectional view of two of our torsion rings illustrating the manner in which they are mounted upon a common form of piston.

Figure 4 is an enlarged schematic sectional view of the invention demonstrating the torsion ring in what might be termed the rest or relaxed position; and Figure 5 is a schematic sectional view similar to Figure 4 but demonstrating the relative position of the ring against the cylinder wall when it is in what might be termed its stressed or sealing position.

Figure 1:
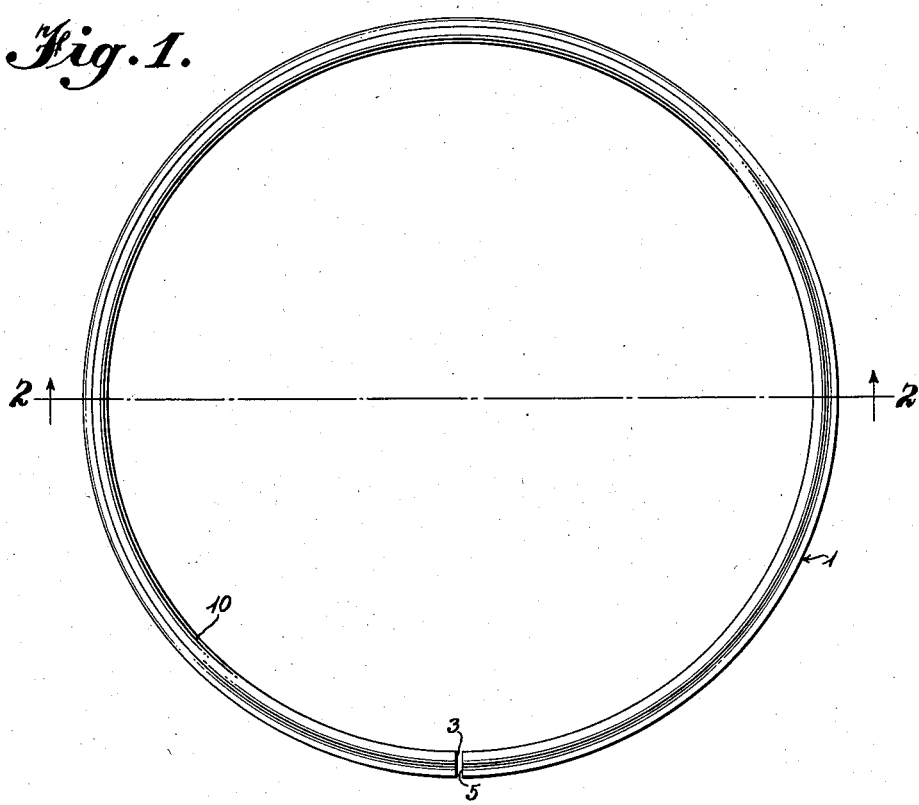
Figure 1 is a top plan view of the piston ring comprising our invention.

Referring more particularly to these various figures, the ring is generally indicated at 1, Figure 1 also showing it to be a so-called split ring having two opposed ends 3 and 5. After positioning of the ring, these are separated that amount which is predetermined to be sufficient to permit expansion of the ring at elevated temperatures without binding.

Figure 2:
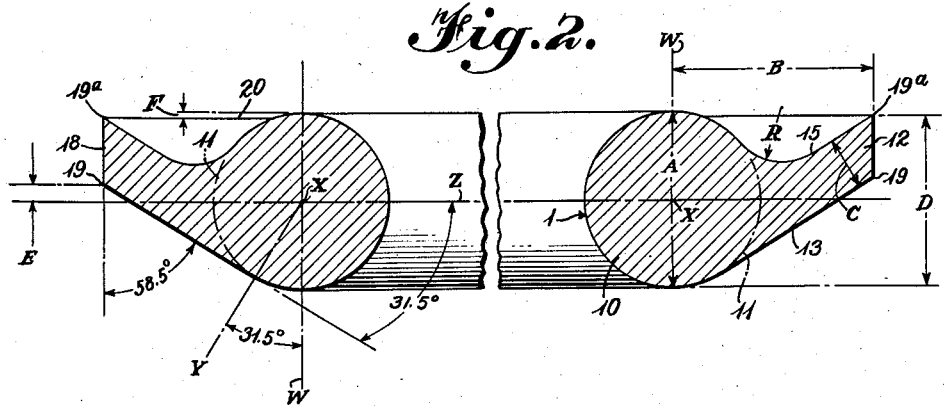
Figure 2 is an enlarged cross-sectional view of the ring taken on the line 2—2 of Figure 1.

The ring itself is annular and formed of a main body portion 10 which in radial cross section is circular or substantially semi-circular in configuration as will be more readily visualized with the aid of the dot-and-dash lines 11 in Fig. 2. Such annular main body terminates upon its outer side in an extended dished or frusto-conical flange 12, the latter being that portion of the element that is most flexible and adapted to perform the sealing operation. The term "flexible" is to be construed as meaning that the flange is permitted to be stressed slightly downwardly during conditions of pressure sealing, such stressing actually resulting from a slight twisting or turning of the base or circular portion 10 of the ring about the center axis thereof, or a downward stressing of the flange 12, or a combination of the two. The referred-to center axis is herein designated in Figure 2 at X.

In cross section, and as also shown in Figure 2, the flange 12 consists of lower and upper edges 13 and 15, respectively. It is to be seen that the lower edge 13, in the preferred form of the invention, represents a surface which is in a plane substantially tangent to the circle of the annular or main body portion 10. By observing Figure 2, it is seen, in this preferred embodiment, that an angle of 31.5° is indicated as the amount of arc, in degrees, between a vertical line W drawn through the axis X and a radial line Y at the referred-to point of tangency.

The cylinder wall contacting face of the flange 12 of the ring is represented at 18. As may be observed, this is a substantial surface and, in the preferred embodiment, should be of a thickness approximating three-fourths of the radius of the circular cross section, although it has been found that a thickness of down to one-fourth of such radius may be sufficient. In the preferred embodiment of our invention, this face 18 is cut upon a plane which, as viewed in Figure 2, is parallel to the vertical line W drawn through the central axis X of the body portion 10. Such contacting face 18, in this preferred showing, may be differently described as being cut upon a plane which is at an angle of about 60° and preferably approximately 58.5° to the line or plane represented by the lower surface of the flange, or edge 13. Conversely, this lower edge is thus angled about 30° and preferably about 31.5° to a horizontal plane or line 2 passing through axis X, as seen in this figure. These angles may be varied within practical limits without seriously modifying the mode of operation of the ring. Reference to Figure 2 will make explicit what has been described in the foregoing with respect to both the bottom edge 13 and the contacting face 18.

In this preferred embodiment of our invention the contacting face 18 of the flange terminates at its lower edge at a point which is above the plane Z passing laterally through the center of rotation X of the body portion 10. This is also clearly shown in Figure 2 where it will be observed that such edge, here designated at 19, extends substantially above the horizontal plane or line Z which is scribed through the center axis X or medially of the body portion 10. In operation, this relative positioning of the flange 12 and the contacting face 18 thereof is most significant. As hereinbefore stated, such flange is to be considered as pivoted, the pivot point being the center X. We have found that if the major portion of the contacting surface 18 is not appreciably above that axis or about the lateral plane 2 drawn through that axis as seen in Figure 2, the ring will tend to bind as a result of pressures exerted downwardly upon the flange. The edge 19 could be disposed slightly below the plane Z, but such disposition would not be the preferred design. On the other hand, if the flange 12 is positioned as described, downward pressures have no other effect than to force the flange, and of course the contacting face 18, into a tight and sealed contact with the surface of the cylinder wall.

The aforesaid flange 12 is of appreciable uniform thickness, as indicated at C in Figure 2. Its upper surface 15 graduates from a straight line into a concave arc to smoothly merge into the upper surface or rounder curvature of the body portion 10. The radius R indicates the preferred radius upon which such arc is scribed.

Two of the torsion piston rings of our invention are shown in Figure 3 in seated position upon a usual type of piston 25 provided with special ring grooves 27. The side walls 32 and 34 of such grooves are preferably disposed in substantially parallel relationship. These grooves are only a very small amount larger than the cross-sectional diameter A of the body portion 10 of the ring, and, in practice, if the groove is between about .0001 to about .0115 of an inch larger than the portion 10 of the ring, this will be sufficient for practical purposes. Such tolerances are conventional in normal practice.

In any event, it is to be appreciated that the torsion ring fits closely within the ring grooves 27, there being little appreciable clearance between the ring and groove and hence little or no opportunity for gases under pressure to be "blown by" or to be forced around the back portion of the ring.

As depicted in Figure 3, the torsion ring of this invention is shown as being applied to a piston for use in an internal combustion engine without any special oil ring. This combustion engine may be a two-cycle engine. Prefatory to a description of this particular usage of the torsion ring, reference is made to the normal operation or cycle of the usual type of two-cycle engine where it is well-known to those skilled in the art that the power stroke occurs on each downward movement of the piston and the so-called compression stroke is a compression of the gases in the crank case, such gases being subsequently discharged through the usual ports to the space above the piston. It is also to be recognized that in a two-cycle engine, oil consumption and oil control along the walls of the cylinder is not of particular concern as oil consumption is here controlled by the fuel-oil ratio. Hence, in the instant case, the two torsion rings are applied to the piston in opposed fashion or, stated differently and in the preferred form, with the upper ring having its flange turned upwardly and the lower ring having its flange turned in the opposite direction or downwardly. Each power stroke of the piston will result in tight sealing contact of the upper ring against the cylinder wall; each downward stroke will also result in the lower ring effectuating compression of the gases in the crank case. The tendency of the downstroke resulting in such compression is to also turn the flange of the lower ring somewhat upwardly to a more lateral position or a position in tighter contact with the cylinder wall.

Thus, in this downward movement of the piston, resulting from the explosion, the upper ring tightly seals against the cylinder wall to contain the expanding gases while the lower ring likewise exercises a similar function to assure effective compression of the crank case gases in preparation for the next cycle of the engine.

The two opposed torsion rings 27 are shown in the expressed opposed relationship, the upper ring having its flange 12 disposed upwardly and the lower ring having its flange 12 disposed downwardly. These two rings are located at the upper portion of the piston 25 which lies within a cylinder 38 and which is fitted with a wrist pin, not shown through the usual type of bore 28. The skirt portion of the piston is designated at 29. Since these rings, as herein described, are comparatively small in dimension, they occupy far less space than the normal type of compression ring and permit a greater clearance volume or, in the alternative, a higher compression ratio in the allotted space than in instances where the rings would necessarily have to be spaced further apart and would individually occupy more area. In any event, by reference to Figure 3, it will be apparent, and as summarized in the foregoing, that during periods of the cycle in a two-cycle engine where pressure is applied above the piston during the power stroke, the flange 12 of the upper ring will be forced by the pressures of the expanding gases downwardly with consequent momentary and tight pressure against the cylinder wall 38. Further, and as stated, by this same downward stroke of a two-cycle operation, the lower ring performs the function of sealing the gases in the crank case against escape, the pressure of the latter similarly tending to position the lower flange 12 in relatively tight, sealing relationship with the cylinder wall 38.

While the foregoing explanation has been particularly directed to the use of the invention in a two-cycle engine, it is to be emphasized that the torsion ring has equal value, and functions with equal resultant utility, as a compression ring during the compression and power strokes of a four-cycle internal combustion engine.

Of course, it is to be appreciated that, particularly in so far as the oil scraping function of the torsion ring of this invention is concerned, additional rings (not shown) may be applied to the lower skirt portion 29 of the piston. These may be positioned with the flange faced downwardly and will materially and effectively remove excess lubrication from the cylinder wall on the down stroke of the piston. Also, it will be understood by those skilled in the art that the torsion ring can be used with conventional rings as either a compression or oil scraper ring.

In the foregoing, the torsion ring has been discussed with respect to the two positions of rest and sealing contact. These positions are more clearly shown in Figures 4 and 5. It is to be understood that such figures must necessarily be diagrammatic in nature, and accordingly that the clearances and angles of contact herein shown are greatly exaggerated. In actual practice, the movement of the ring flange 12 from a position of rest to a position of sealing contact may not be more than .001 of an inch, or even less. Yet this has been found to be fully adequate to achieve the objectives and advantages of the invention as herein set forth.

Figure 4 shows the torsion ring in its so-called position of rest. Here, the sealing surface 18 of the flange is in approximately parallel position with respect to the cylinder wall and in such position there is a slight clearance 42 between it and the wall. The clearance between the piston 25 and the wall 38 is also greatly exaggerated. It is represented at 40 and shown to be somewhat greater than the clearance 42 between the contact face 18 and the wall. This clearance will vary, depending on the material used in making the cylinder and the piston. As shown in this figure, no gas pressure is being applied to the flange 12. Its movement in this position within the cylinder is thus accomplished with little or no friction and without perceptible wear.

In Figure 5, the direction of force of gases under high pressure is indicated by an arrow positioned within the clearance space 40. Such downward pressures pivot the flange 12 about the rounded edge of the annular portion 10 to such a degree that the upper surface of the contact face 18 is in tight contact with the cylinder wall 38. Such pivoting will naturally position the face 18 at somewhat of an angle to the vertical and this angle is represented by the numeral 50, showing that the lower edge of the contact face 18 may not be exactly in alignment with the surface of the cylinder wall 38. Those skilled in the art will appreciate that after some wear, the described configuration of the face 18 may change somewhat. However, this will not interfere with its sealing function.

As may be inferred from the foregoing, the invention is subject to various adaptations. For example, the torsion ring may be used simply as a compression ring or as an oil ring. Two torsion rings, as in Figure 3, may be utilized together in a fashion which as described above is particularly applicable to two-cycle engines. Employed only as an oil scraper ring, the torsion ring may be used with conventional tension rings. As alternatives, an oil control ring of previous and known type may be positioned on the piston below an upper torsion compression ring and lower torsion oil scraper ring, or the upper torsion compression ring may be simply used in conjunction with a lower, conventional oil control ring.

An approximation of the comparative size of the torsion ring of our invention may be gathered from reference to a specific embodiment thereof. Description of such specific embodiment is to be considered as exemplary only, and not as substantially excluding any other alternative dimension. In certain tests, a torsion ring 72.26 mm. I. D. and 76.1 mm. O. D., made of cast iron and having the following dimensions, was employed. This ring at its thickest part, or at the diameter A (Figure 2) of the circular cross section of the body 10, was 1.2 mm. The contact face 18 of the flange 12 was positioned a horizontal distance of 1.32 mm. from the line W passing through the axis X, as indicated by the reference letter B in Figure 2. The thickness C of the flange itself amounted to 0.40 mm. and the distance E of the lower edge 19 of that flange about the horizontal plane Z drawn through the center axis X as seen in Figure 2 was 0.115 mm. As represented in this same Figure 2, the distance D represents the distance from the bottom of the body portion 10 to the upper edge of the flange 12. This distance D is somewhat less than the diameter of the circular body section, which is 1.2 mm., and in the preferred embodiment which we are herein describing was 1.17 mm. The upper edge 19$^a$ of the flange 12 preferably lies in a plane 0.03 mm. inwardly of the plane of the top of the body portion 10, as indicated by the dimension F.

Reference has been made to a circumscribed radius R which represents the curve joining the upper portion of the annular formation 10 and the upper edge 15 of the flange. In such preferred embodiment of the invention, this radius was 0.36 mm., the lowest part of the arc scribed upon the radius R being 0.33 mm. below the plane of the top of the circular body 10.

Thus, those skilled in the art will appreciate that the ring of our invention is substantially smaller in cross-sectional dimension than conventional rings. This is possible because no inherent spring loading is required. Also, smaller dimensions are desirable since rotation of the flange of the ring about the center axis X is a function of torsional stress placed upon the annular portion 10 and the inherent elastic properties of the metals employed, permitting rotation of the flange in the manner indicated. Such smaller dimensions of the ring produce highly advantageous results, primary among which are the factors of less wear, less weight and less heat produced during operation because of reduced friction. These advantages are also due to better heat dissipation. Those skilled in the art will realize that additional advantages can be obtained with the redesign of pistons, taking advantage of the smaller ring groove and improved operating characteristics of this ring.

In brief, the operation of our invention may be summarized as follows:

In inactive position, the flange 12 does not bear tightly against the part to be sealed off, i. e., the cylinder wall 38. When pressure occurs, the flange 12 does bear tightly, the ring turning about the center of the section circle X so that the bearing face 18 of the flange is pressed tightly against the cylinder wall. Due to the resultant counter-pressure, the circular back part of the ring is pressed against the bottom of the correspondingly rounded ring groove 27 to also maintain a seal in that region.

In the packing according to the invention, the axial play can be very slight and, in the case of pistons, the piston temperatures will consequently remain low due to good heat transfer through the ring to the cylinder.

The turning of the ring about the axis of its section by the involved gas or oil pressures and the resultant torsion in operation cause not only tight contact during the working stroke but also very slight contact during the return stroke, so that the frictional forces, which are always operative in the known ring packings owing to the inherent ring tension, are considerably reduced.

From the above detailed description of the invention, it is believed that the construction will be apparent at once, and while there are herein shown and described preferred embodiments of the invention, it is nevertheless to be understood that many changes may be made therein without departing from the principle and scope of the invention as claimed.

We claim:

1. A piston ring element having in cross section an approximately semi-circular piston engaging portion, said portion having a centrally located center of rotation, said portion graduating to an extended flange of a material and proportion as to flex about said center and provided with a cylinder wall contacting face, the greater portion of said face being positioned to one side of a lateral plane running through said center of rotation.

2. A sealing ring, comprising: an annular body portion having a periphery of approximately semicircular, radial configuration, and an annular flange projecting obliquely from said body portion and extending across a plane disposed at right angles to the axis of said body portion and passing medially through said body portion, said flange having a peripheral sealing face at least the major portion of which is disposed on the side of said plane beyond the point of crossing of said plane by said flange, said flange being of a material and proportion as to flex upon the application of pressure thereto.

3. A sealing ring, comprising: an annular body portion having a periphery of approximately semicircular, radial configuration, and an annular frusto-conical flange projecting from said body portion and having a peripheral sealing face situated entirely to one side of a plane disposed at right angles to the axis of said body portion and passing medially through said body portion, said flange being of a material and proportion as to flex upon the application of pressure thereto.

4. A sealing ring, comprising: an annular body portion having an approximately circular radial cross section and an annular flange projecting obliquely from said body portion and extending across a plane disposed at right angles to the axis of said body portion and passing medially through said body portion, said flange having a peripheral sealing face at least the major portion of which is disposed on the side of said plane beyond the point of crossing of said plane by said flange, said flange being of a material and proportion as to flex upon the application of pressure thereto.

5. A sealing ring as defined in claim 4, in which the sealing face of the flange is substantially parallel with a vertical plane passing through the axis of the body portion.

6. A sealing ring as defined in claim 4 in which the dimensional width of the sealing face of the flange is equal to at least one-fourth of the radius of said circular cross section.

7. A sealing ring as defined in claim 4 in which the dimensional width of the sealing face of the flange is between about one-fourth to about three-fourths of the radius of said circular cross section.

8. A sealing ring, comprising: an annular body portion having an approximately circular radial cross section, and an annular flange projecting approximately tangentially from said body portion and intersecting a plane disposed at right angles to the axis of said body portion and passing medially through said body portion, said flange being of a flexible material adapted to flex upon the application of pressure thereto, said flange having a peripheral sealing face situated entirely on the side of said plane beyond the point of intersection of said flange with said plane.

9. A sealing ring as defined in claim 8, in which the flange is tangent to a radius of the body cross section disposed at an angle of at least 20° relative to the vertical axis of the body portion.

10. A piston ring, comprising: an annular body portion having a cross section of approximately semicircular, radial configuration adapted to seat against the bottom of a ring groove of complementary shape; and an annular dished flange projecting outwardly from said body portion and terminating in a face adapted to contact a cylinder wall to form a seal therewith, said cylinder-contacting face being situated entirely to one side of a plane passing medially through said body portion, said flange being of a material and proportion as to flex upon the application of pressure thereto.

11. In combination with an engine cylinder having a bore: a piston in said bore, and a piston ring on said piston, said piston being provided with a ring groove having substantially parallel side walls and an inner, back wall of generally semicircular configuration, said piston ring having a body portion with an inner peripheral surface of a configuration approximating the contour of the inner, back wall of said ring groove and engaging the inner, back wall of said ring groove, said piston ring also having an outwardly extending dished flange terminating in a vertical face for engaging the wall of said cylinder bore, said face being situated to one side of a plane passing medially through the body portion of said ring and having a predetermined outside diameter such that said face normally fits said bore with at most only very light contact, said ring being constructed of material permitting torsional distortion of its radial cross section upon the application of engine operating pressures to the concave side of said flange, whereby said operating pressures cause said flange to tend to enlarge in diameter and forcibly engage said face in tight sealing contact with said cylinder bore.

12. A torsion ring adapted for use on a piston, comprising: an annular body portion having an approximately circular radial cross section, said body portion being adapted to seat against and to form a seal with a piston ring groove having a bottom of complementary shape, and an annular flange extending outwardly from said body portion in the plane of said body portion and on an angle relative to said plane, and terminating in a cylinder wall engaging face, said body portion and flange being of that proportion and material having sufficient elasticity to permit torsional distortion thereof about an axis coinciding with the center of the circular cross section of said body portion upon application of pressure against a side surface of said flange.

13. In combination: a piston, and a piston ring, said ring comprising an annular body portion having an approximately circular radial cross section, said piston having a ring groove of a width only slightly greater than the diameter of said radial cross section of said body portion and having a bottom wall of semi-circular contour complemental to the radially circular contour of said body portion, said body portion being adapted to seat against and to form a seal with the bottom of said ring groove, and an annular flange extending outwardly from said body portion in the plane of said body portion and on an angle relative to said plane and terminating in a cylinder wall engaging face, said body portion and flange being of that proportion and material having sufficient elasticity to permit torsional distortion thereof about an axis coinciding with the center of the circular cross section of said body portion upon application of pressure against a side surface of said flange.

14. In combination with an engine cylinder having a bore: a piston in said bore, said piston having a torsion ring groove in the upper portion thereof, a tension ring groove above said torsion ring groove, a compression tension ring in said tension ring groove, a torsion ring in said torsion ring groove, said torsion ring having a body portion of semicircular, radial configuration and an annular frusto-conical flange projecting angularly to the lateral from said body portion, said flange being of a material of sufficient resiliency to flex outwardly upon the application of pressure thereto, said flange projecting downwardly with respect to said piston and said bore, said flange terminating in a vertical face for engagement with the wall of said bore, said face contacting said bore with at most light contact, whereby said flange may be stressed into tighter contact with said bore during periods of increased gas pressures below said piston.

15. A sealing ring, comprising: an annular body portion having a piston-contacting periphery, said periphery being approximately circular in radial configuration, an annular flange projecting obliquely from said body portion and extending across a plane disposed approximately at a right angle to the axis of said body portion and passing medially through said body portion, said flange having a peripheral sealing face at least the major portion of which is disposed on the side of said plane beyond the point of crossing of said plane by said flange, said flange being of a material and proportion to flex upon the application of pressure thereto.

16. A piston ring element comprising an annular body portion, said body portion including a periphery having a radial, cross-sectional configuration which approximates the arc of a circle, an annular frusto-conical flange projecting from said body portion and having a peripheral sealing face situated substantially to one side of a plane disposed at right angles to the axis of said body portion and passing medially through said body portion, said flange being of a material and proportion to flex upon the application of pressure thereto.

References Cited in the file of this patent

UNITED STATES PATENTS

| | | |
|---|---|---|
| 1,330,188 | Johnston | Feb. 10, 1920 |
| 2,620,206 | Cornelius | Dec. 2, 1952 |